(12) United States Patent
Zhang et al.

(10) Patent No.: US 11,747,306 B2
(45) Date of Patent: Sep. 5, 2023

(54) PIPELINE STRUCTURAL FAULT DIAGNOSIS APPARATUS AND DIAGNOSIS METHOD

(71) Applicant: CHINA UNIVERSITY OF PETROLEUM-BEIJING, Beijing (CN)

(72) Inventors: Hong Zhang, Beijing (CN); Xiaoben Liu, Beijing (CN); Tong Shi, Beijing (CN); Honglin Zhao, Beijing (CN); Chengqi Liu, Beijing (CN); Jie Liu, Beijing (CN)

(73) Assignee: China University of Petroleum - Beijing, Beijing (CN)

( * ) Notice: Subject to any disclaimer, the term of this patent is extended or adjusted under 35 U.S.C. 154(b) by 0 days.

(21) Appl. No.: 17/690,475

(22) Filed: Mar. 9, 2022

(65) Prior Publication Data

US 2023/0104546 A1 Apr. 6, 2023

Related U.S. Application Data

(63) Continuation of application No. PCT/CN2021/127883, filed on Nov. 1, 2021.

(30) Foreign Application Priority Data

Sep. 18, 2021 (CN) .............................. 202111110028.7

(51) Int. Cl.
*G01N 29/04* (2006.01)
*F16L 55/40* (2006.01)
*G01N 29/12* (2006.01)
*F16L 101/30* (2006.01)

(52) U.S. Cl.
CPC .............. *G01N 29/043* (2013.01); *F16L 55/40* (2013.01); *G01N 29/048* (2013.01); *G01N 29/12* (2013.01); *F16L 2101/30* (2013.01)

(58) Field of Classification Search
CPC ...... G01N 29/043; F16L 55/40; G01N 29/048; G01N 29/12; F16L 2101/30
USPC ........................................................... 73/645
See application file for complete search history.

(56) References Cited

U.S. PATENT DOCUMENTS

| | | | |
|---|---|---|---|
| 6,644,848 B1* | 11/2003 | Clayton et al. ........ | E21B 43/01 73/61.62 |
| 7,607,351 B2* | 10/2009 | Allison et al. ........... | G01H 3/12 702/54 |

(Continued)

FOREIGN PATENT DOCUMENTS

| | | |
|---|---|---|
| CN | 102330887 A | 1/2012 |
| CN | 104373821 A | 2/2015 |

(Continued)

*Primary Examiner* — Jacques M Saint Surin
(74) *Attorney, Agent, or Firm* — Pokalsky Wilczynski Brozek, LLP (57) ABSTRACT

The present application provides a pipeline structural fault diagnosis apparatus and a diagnosis method. The pipeline structural fault diagnosis apparatus includes a signal generating apparatus configured to generate an acoustic wave signal by knocking a pipeline; a signal collecting apparatus configured to collect the acoustic wave signal; a signal storage apparatus configured to store the acoustic wave signal for a signal processing and analyzing apparatus to analyze and determine a fault type, a fault degree, and a fault position. The acoustic wave signal after being generated by the signal generating apparatus is collected by the signal collecting apparatus and stored in the signal storage apparatus. The signal processing and analyzing apparatus extracts the acoustic wave signal in the signal storage apparatus, and performs processing and analysis to determine the fault type, the fault degree, and the fault position of the pipeline structure.

10 Claims, 4 Drawing Sheets

(56) References Cited

U.S. PATENT DOCUMENTS 8,296,083 B2* 10/2012 Martin .............. G01N 29/4427
702/56
2018/0292285 A1* 10/2018 Frueh ................ G01N 29/2412

FOREIGN PATENT DOCUMENTS

| CN | 106596123 | A | 4/2017 | |
|---|---|---|---|---|
| CN | 107748314 | A | 3/2018 | |
| CN | 109681720 | A | 4/2019 | |
| CN | 110045024 | A | 7/2019 | |
| CN | 110940727 | A | 3/2020 | |
| CN | 112483908 | A | 3/2021 | |
| CN | 2021111100287 | | 3/2022 | |
| CN | 2021127883 | | 4/2022 | |
| CN | 114861942 | A * | 8/2022 | |
| EP | 3671204 | A1* | 6/2020 | ............. F16L 55/26 |
| GB | 2457304 | A | 8/2009 | |
| KR | 20200127705 | A | 11/2020 | |

* cited by examiner

PIPELINE STRUCTURAL FAULT DIAGNOSIS APPARATUS AND DIAGNOSIS METHOD

CROSS-REFERENCE TO RELATED APPLICATIONS

This application is a continuation application of International Application No. PCT/CN2021/127883, filed on Nov. 1, 2021, which claims priority to Chinese Patent Application No. 202111110028.7, filed on Sep. 18, 2021. The disclosures of the aforementioned applications are hereby incorporated by reference in their entireties.

TECHNICAL FIELD

Embodiments of the present application relate to the technical field of natural gas pipeline safety and, in particular, to a pipeline structural fault diagnosis apparatus and a diagnosis method.

BACKGROUND

Pipeline transport plays a pivotal role in the natural gas industry. There may be various faults in natural gas pipelines during pipeline transport, such as stress, defects exceeding standard or soil outside the pipeline being not backfilled according to design and construction requirements. Pipeline accidents caused by natural gas pipeline faults will cause huge losses to social economy and natural environment. In order to ensure the safe and stable operation of natural gas pipelines and reduce the incidence of accidents in pipeline transport, it is necessary to carry out fault diagnosis of natural gas pipelines, and to discover and eliminate hidden dangers in time.

However, in the prior art, there is still a lack of multi-fault comprehensive diagnosis apparatus for natural gas pipelines.

SUMMARY

The embodiments of the present application provide a pipeline structural fault diagnosis apparatus and a diagnosis method, which are configured to fill the gap of the lack of the multi-fault comprehensive diagnosis apparatus for natural gas pipeline structures in the prior art.

In a first aspect, an embodiment of the present application provides a pipeline structural fault diagnosis apparatus, including:
- a signal generating apparatus, and the signal generating apparatus includes a moving member and a knocking member arranged on the moving member, the moving member is configured to move along an inner wall of a pipeline, and the knocking member is configured to knock the inner wall of the pipeline to generate an acoustic wave signal;
- a signal collecting apparatus connected with the moving member, and the signal collecting apparatus is configured to collect the acoustic wave signal;
- a signal storage apparatus connected with the signal collecting apparatus, and the signal storage apparatus is configured to store the acoustic wave signal for a signal processing and analyzing apparatus to analyze and determine a fault type, a fault degree, and a fault position.

In an implementation, the knocking member includes a mounting frame, a driving part, and a knocking arm; the mounting frame is connected with the moving member, and a middle portion of the knocking arm is rotatably connected with the mounting frame;
one end of the driving part is connected with the mounting frame, and the other end of the driving part is rotatably connected with a rotating shaft, and the rotating shaft is provided with a friction wheel and a cam fixedly connected with the friction wheel, the friction wheel is configured to abut against the inner wall of the pipeline, the cam is configured to abut against one end of the knocking arm, and the cam is configured to drive the knocking arm to rotate to make the other end of the knocking arm knock the inner wall of the pipeline.

In an implementation, the knocking member further includes a first elastic member and a second elastic member, the driving part is hinged with the mounting frame, and one end of the first elastic member is connected with the mounting frame, the other end of the first elastic member is connected with the driving part, and the first elastic member is configured to drive the driving part to rotate toward the inner wall of the pipeline;
one end of the second elastic member is connected with the driving part, and the other end of the second elastic member is connected with the knocking arm, and the second elastic member is configured to drive the other end of the knocking arm that is far away from the cam to rotate toward the inner wall of the pipeline.

In an implementation, the knocking arm of the pipeline structural fault diagnosis apparatus has a mounting hole for mounting a bump, and the bump is configured to knock the inner wall of the pipeline, there are a plurality of mounting holes, the bump is detachably mounted in one of the mounting holes, and the plurality of mounting holes are arranged at intervals along an extending direction of the knocking arm.

In an implementation, the knocking arm further has a plurality of positioning thread holes, each of the positioning thread holes is connected with one of the mounting holes, and center lines of the positioning thread holes are perpendicular to center lines of the mounting holes; the bump is provided with a matching hole, a portion of the bump is inserted in the mounting hole, fastening bolts are matched with the positioning thread holes, and the matching hole is inserted by a corresponding fastening bolt.

In an implementation, the moving member includes a moving shaft and a plurality of supporting members, and the plurality of supporting members are arranged at intervals along a shaft of the moving shaft, the supporting member is configured for elastic interference fit with the pipeline.

In an implementation, the pipeline structural fault diagnosis apparatus further includes a position detecting apparatus, and the position detecting apparatus is configured to detect a position of the pipeline structural fault diagnosis apparatus in the pipeline; the signal storage apparatus is also configured to store the position.

In a second aspect, an embodiment of the present application provide a diagnostic method, including:
- establishing a sample database, and the sample database includes simulation signal features of various fault types and fault degrees;
- obtaining an acoustic wave signal generated by knocking an inner wall of a pipeline;
- processing the acoustic wave signal to obtain a signal feature;
- comparing the signal feature with the simulation signal features in the sample database to determine a fault type and a fault degree of the acoustic wave signal.

In a possible implementation, the establishing the sample database, and the sample database includes the simulation signal features of various fault types and fault degrees, including:
  performing simulation calculation on pipeline structural faults to obtain simulation signals;
  performing feature extraction on the simulation signals to obtain simulation signal features, and one of the simulation signal features includes a time-domain simulation signal feature and a frequency-domain simulation signal feature;
  storing the simulation signals and the simulation signal features to establish a simulation database;
  classifying the simulation database to establish the sample database.

In a possible implementation, the processing the acoustic wave signal to obtain the signal feature, including:
  performing a preprocessing to obtain a denoised signal;
  performing time-spectrum conversion on the denoised signal to obtain a frequency-domain signal;
  performing feature extraction on the frequency-domain signal to obtain the signal feature, where the signal feature includes a time-domain signal feature and a frequency-domain signal feature.

The embodiments of the present application provide a pipeline structural fault diagnosis apparatus and a diagnosis method, including a signal generating apparatus, and the signal generating apparatus includes a moving member and a knocking member arranged on the moving member, the moving member is configured to move along an inner wall of a pipeline, and the knocking member is configured to knock the inner wall of the pipeline to generate an acoustic wave signal; a signal collecting apparatus, and the signal collecting apparatus is configured to collect the acoustic wave signal; a signal storage apparatus connected with the signal collecting apparatus, and the signal storage apparatus is configured to store the acoustic wave signal for a signal processing and analyzing apparatus to analyze and determine a fault type, a fault degree, and a fault position. The acoustic wave signal after being generated by the signal generating apparatus is collected by the signal collecting apparatus and stored in the signal storage apparatus. The signal processing and analyzing apparatus extracts the acoustic wave signal in the signal storage apparatus, and performs processing and analysis to determine the fault type, the fault degree, and the fault position of the pipeline. This is helpful to check pipeline faults in time and ensure the safe operation of the pipeline.

BRIEF DESCRIPTION OF DRAWINGS

To describe the technical solutions in embodiments of the present application or in the prior art more clearly, the following briefly introduces the accompanying drawings needed for describing the embodiments or the prior art. Apparently, the accompanying drawings in the following description are some embodiments of the present application, and persons of ordinary skill in the art may still derive other drawings from these accompanying drawings without creative effort.

DESCRIPTION OF EMBODIMENTS

In order to clearly understand technical solutions of the present application, the solutions of the prior art are first introduced in detail.

Pipeline transport plays a pivotal role in the oil and gas industry. The main reasons for natural gas pipeline faults include the following: overlarge residual stress in the pipeline or the combination of stresses caused by external loads, where the stress includes hoop stress and axial stress, and the axial stress includes tensile, compressive, and bending stresses; defects in the pipeline body or welding lines and other structural defects, where the defects refer to volumetric defects (such as corrosion, metal loss), planar defects (such as cracks) and other geometric defects (such as depressions, geometric defects of welding line); and that the soil backfilling condition outside the pipeline does not meet construction requirements, where the soil backfilling condition outside the pipeline refers to the type, particle size, and non-uniformity of axial and circumferential backfilling of soil backfilled outside the pipeline.

When the above phenomena occur, they will threaten pipeline safety, and even cause the pipeline to rupture and leak, resulting in huge losses to social economy and natural environment. In order to ensure the safe and stable operation of natural gas pipelines and reduce the incidence of accidents in pipeline transport, it is necessary to carry out fault diagnosis of natural gas pipelines, and to discover and eliminate hidden dangers in time. However, in the prior art, there is still a lack of multi-fault comprehensive diagnosis apparatus for natural gas pipelines.

On that account, the embodiments of the present application provide a pipeline structural fault diagnosis apparatus and a diagnosis method, including: a signal generating apparatus, and the signal generating apparatus is configured to generate an acoustic wave signal by knocking a pipeline; a signal collecting apparatus, and the signal collecting apparatus is configured to collect the acoustic wave signal; a signal storage apparatus, and the signal storage apparatus is configured to store the acoustic wave signal for a signal processing and analyzing apparatus to analyze and determine a fault type, a fault degree, and a fault position. The acoustic wave signal after being generated by the signal generating apparatus is collected by the signal collecting apparatus and stored in the signal storage apparatus. The signal processing and analyzing apparatus extracts the acoustic wave signal in the signal storage apparatus, and performs processing and analysis to determine the fault type, the fault degree, and the fault position of the pipeline. This is helpful to check pipeline faults in time and ensure the safe operation of the pipeline.

Several alternative implementations of the present application will be introduced below in conjunction with the accompanying drawings. Those skilled in the art should understand that the following implementations are only illustrative, not exhaustive enumeration. On the basis of these implementations, those skilled in the art can replace, concatenate or combine some features or some examples, which should still be regarded as the disclosure contents of the present application.

Figure 1:
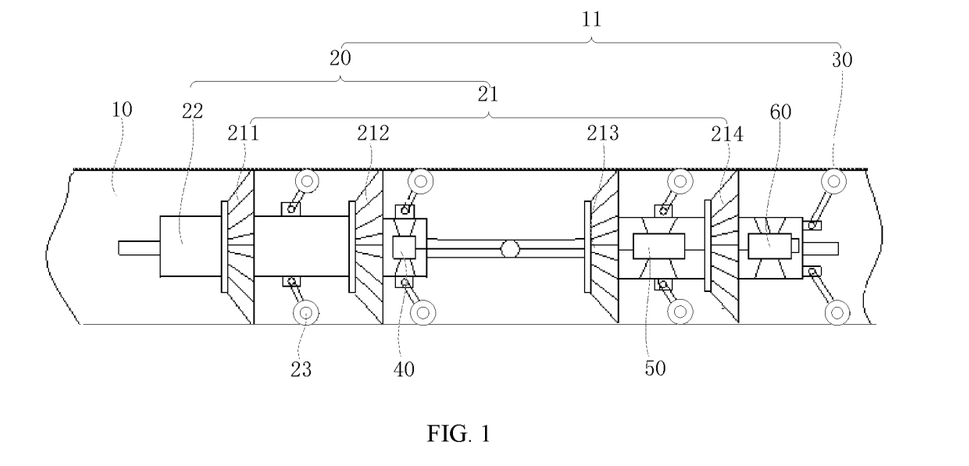
FIG. 1 is a schematic structural diagram of a pipeline structural fault diagnosis apparatus provided by an embodiment of the present application.

Referring to FIG. 1, a pipeline structural fault diagnosis apparatus provided by an embodiment of the present application specifically includes: a signal generating apparatus 11, a signal collecting apparatus 40, and a signal storage apparatus 50. Where the signal generating apparatus 11, the signal collecting apparatus 40, and the signal storage apparatus 50 are all located inside a pipeline 10.

The signal generating apparatus 11 includes a moving member 20 and a knocking member 30 arranged on the moving member 20. The moving member 20 is configured to move along an inner wall of the pipeline 10, and the knocking member 30 is configured to knock the inner wall of the pipeline 10 to generate an acoustic wave signal.

The moving member 20 can be a pipeline robot working in the pipeline 10, and the driving mode of the pipeline robot can be, for example, one of caterpillar driving, fluid flow driving in the pipeline 10, mechanical foot driving and the like.

In this embodiment, the moving member 20 can use the own pressure of a fluid in the pipeline 10 as a driving force. The moving member 20 can be, for example, a pipeline pig. The pipeline pig is a device for cleaning and maintenance of the pipeline 10 by moving inside the pipeline 10, scraping dirt on the inner wall of the pipeline, and pushing the dirt and sundries accumulated in the pipeline 10 out of the pipeline.

Alternatively, the moving member 20 includes a moving shaft 22 and a plurality of supporting members 21 arranged at intervals on the moving shaft 22, and the supporting members 21 are configured to abut against the inner wall of the pipeline to play a supporting and fixing role. Since there is a differential pressure on both sides of the supporting members 21 in the pipeline 10, the supporting members 21 can move from a high pressure end to a low pressure end by the drive of the differential pressure, so that the moving shaft 22 moves in the pipeline 10.

The moving principle of the moving member 20 will be briefly illustrated below with reference to FIG. 1. For example, a right end of the pipeline 10 can be an inlet end of the fluid, and a left end of the pipeline 10 can be a consumption end of the fluid. For the moving member 20 placed in the pipeline 10, a side of the moving member 20 close to the inlet end of the fluid generates a high pressure due to the continuous inflow of the fluid, and a side of the moving member 20 close to the consumption end of the fluid generates a low pressure due to the continuous consumption of the fluid. Under the differential pressure between the two sides of the moving member 20, the moving member 20 is driven to move toward the consumption end of the fluid, that is, the moving member 20 moves toward the left end of the position shown in the figure. It should be noted that the enclosed space is a dry space, which is beneficial for the knocking member to knock the inner wall of the pipeline to generate the acoustic wave signal.

Exemplarily, the supporting members 21 include a first supporting member 211, a second supporting member 212, a third supporting member 213, and a fourth supporting member 214. As shown in FIG. 1, in order to ensure the smooth movement of the moving member 20 in the pipeline 10, the center line of the moving shaft 22 coincides with the center line of the pipeline 10. The moving shaft 22 may include a first moving shaft and a second moving shaft, and the first moving shaft and the second moving shaft are hinged by an articulated shaft, which is beneficial for the moving of the moving shaft 22 in the curved pipeline 10. The first supporting member 211 and the second supporting member 212 are arranged on the first moving shaft, and the third supporting member 213 and the fourth supporting member 214 are arranged on the second moving shaft.

In this embodiment, the knocking member 30 is connected with the moving member 20, and the knocking member 30 is located behind the second supporting member 212, which can improve the quality of the generated acoustic wave signal and prevent the acoustic wave signal from mingling with a noise signal. Furthermore, since the knocking member 30 is located behind the second supporting member 212, using knocking member 30 to knock the inner wall after the first supporting member 211 of the moving member 20 removes the dirt in the pipeline 10 is beneficial to improve the knocking effect of the knocking member 30.

In a possible implementation, the knocking member 30 is an electric knocking device, such as an electric hammer. By setting the knocking frequency of the electric hammer, the inner wall of the pipeline 10 is regularly knocked to generate the desired acoustic wave signal.

In this embodiment, the signal collecting apparatus 40 is configured to collect the acoustic wave signal. The signal collecting apparatus 40 is located behind the second supporting member 212 and is connected with the moving shaft 22, so that the signal collecting apparatus 40 can move with the moving shaft 22.

In a possible implementation, the signal collecting apparatus 40 may use an audio recorder, collect the acoustic wave signal by the audio recorder, and convert the collected acoustic wave signal from analog quantity to digital quantity for the subsequent analysis and processing. Of course, in other possible implementations, the signal collecting apparatus 40 may also be implemented by using other acoustic wave collecting apparatuses, for example, using an sound probe or a microphone array for collection.

The signal storage apparatus 50 is connected with the signal collecting apparatus 40, and the signal storage apparatus 50 is configured to store the acoustic wave signal so as to process and analyze the acoustic wave signal subsequently. The signal storage apparatus 50 may be, for example, a read-only memory (ROM) or other types of static storage devices that can store static information and instructions, a random access memory (RAM) or other types of dynamic storage devices that can store information and instructions, an electronically erasable programmable read-only memory (EEPROM), a CompactDisc Read-Only Memory (CD-ROM) or other optical disk storages, optical disc storages (including a compressed disc, a laser disc, an optical disc, a digital versatile disc, a Blu-ray disc, etc.), a magnetic disk storage medium or other magnetic storage devices, or any other mediums which can be used to carry or store desired program codes having instructions or in a data structure form and which can be accessed by a computer, but are not limited thereto.

In this embodiment, the supporting member is a leather cup, the leather cup is sheathed on the moving shaft 22, and the outer diameter of the leather cup is larger than the inner diameter of the pipeline 10, so that the leather cup can be closely fitted with the pipeline 10, thus the supporting member can support the inner wall of the pipeline and form a differential pressure. Of course, in other examples, the supporting member may also be other structures that are able to support the inner wall of the sealing pipeline 10, such as a rubber sealing ring.

It should be noted that, after the collection and storage of the acoustic wave signal are completed in the pipeline, the signal storage apparatus 50 can be taken out and connected in communication with a processing and analyzing apparatus 70. The signal processing and analyzing apparatus 70 is configured to determine the fault type, fault degree, and fault position according to the acoustic wave signal. In this embodiment, by processing the collected acoustic wave signal, extracting a time-domain feature and a frequency-domain feature in the acoustic wave signal, and comparing a feature signal with acoustic wave signal data of different fault types and fault degrees, the specific fault type and fault degree of the pipeline 10 are determined, and the fault position of the pipeline 10 is further determined.

The embodiments of the present application provide a pipeline structural fault diagnosis apparatus, including a signal generating apparatus 11, and the signal generating apparatus 11 includes a moving member 20 and a knocking member 30 arranged on the moving member 20, the moving member 20 is configured to move along an inner wall of a pipeline 10, and the knocking member 30 is configured to knock the inner wall of the pipeline 10 to generate an acoustic wave signal; a signal collecting apparatus 40, and the signal collecting apparatus 40 is configured to collect the acoustic wave signal; a signal storage apparatus 50 connected in communication with the signal collecting apparatus 40, and the signal storage apparatus 50 is configured to store the acoustic wave signal for a signal processing and analyzing apparatus 70 to analyze and determine a fault type, a fault degree, and a fault position. The acoustic wave signal after being generated by the signal generating apparatus 11 is collected by the signal collecting apparatus 40 and stored in the signal storage apparatus 50. The signal processing and analyzing apparatus 70 extracts the acoustic wave signal in the signal storage apparatus 50, and performs processing and analysis to determine the fault type, the fault degree, and the fault position of the pipeline 10. This is helpful to check faults of the pipeline 10 and ensure the safe operation of the pipeline 10.

Figure 2:
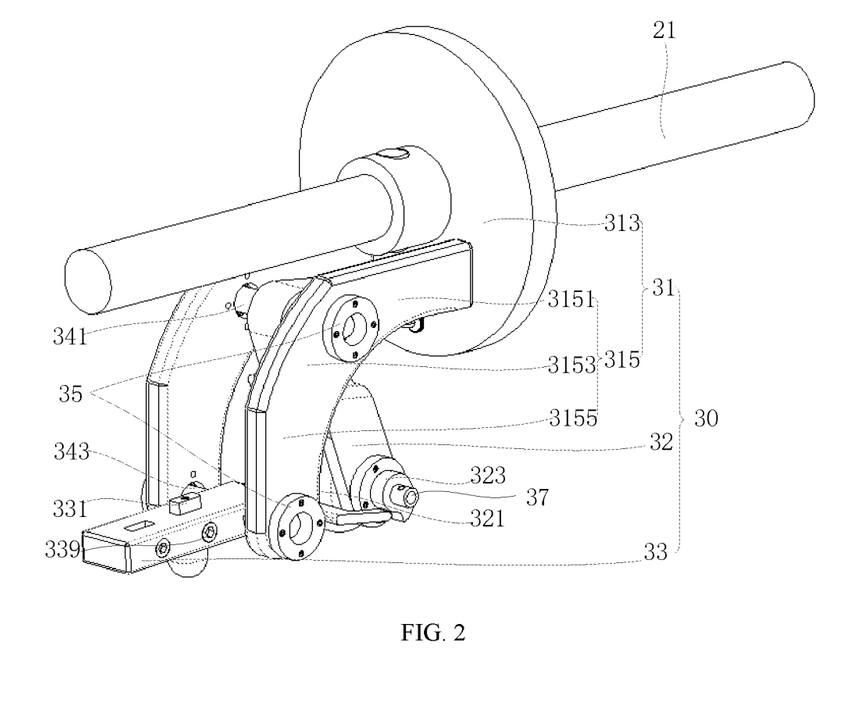
FIG. 2 is a schematic structural diagram of a knocking member from a first perspective in a pipeline structural fault diagnosis apparatus provided by an embodiment of the present application.
Figure 3:
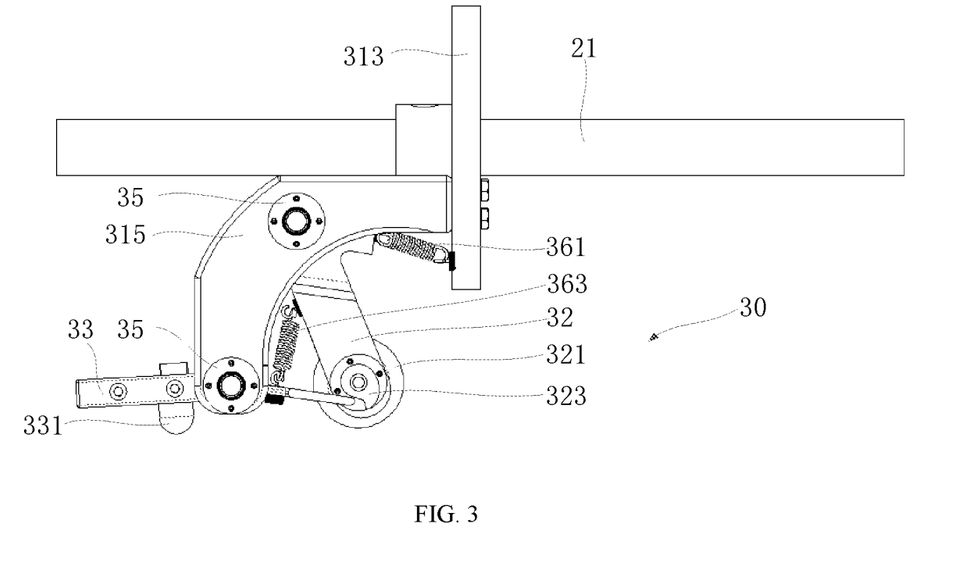
FIG. 3 is a schematic structural diagram of the knocking member from a second perspective in a pipeline structural fault diagnosis apparatus provided by an embodiment of the present application.
Figure 4:
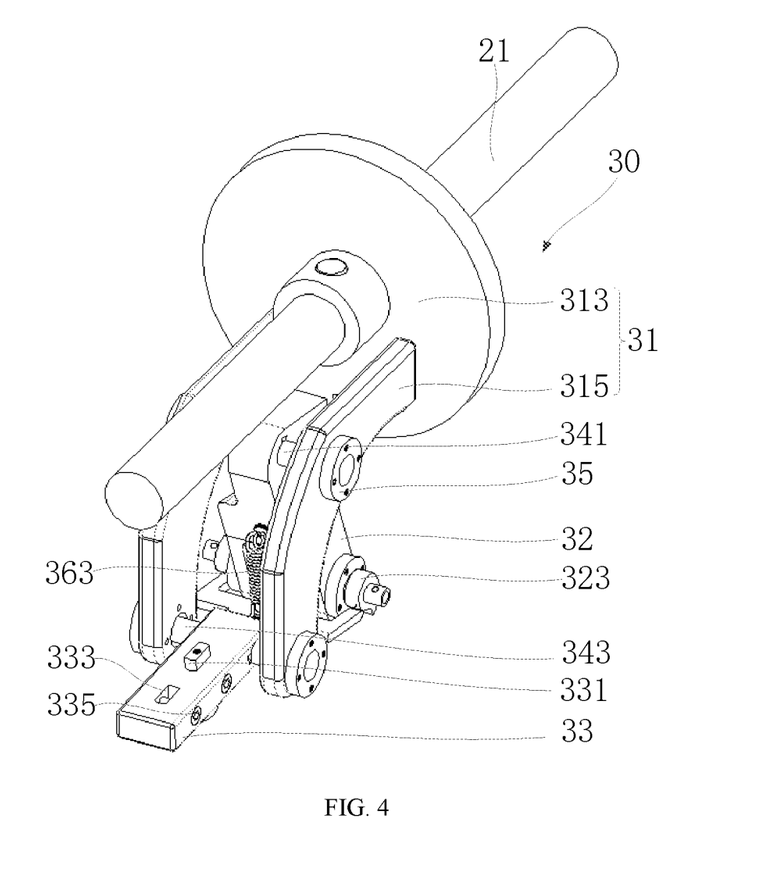
FIG. 4 is a schematic structural diagram of the knocking member from a third perspective in a pipeline structural fault diagnosis apparatus provided by an embodiment of the present application.

Referring to FIG. 2, FIG. 3, and FIG. 4, in this embodiment, the knocking member 30 may be mechanically driven to knock. The knocking member 30 includes a mounting frame 31, a driving part 32, and a knocking arm 33. The driving part 32 and the knocking arm 33 are both rotatably connected with the mounting frame 31, and the mounting frame 31 is connected with the moving shaft 22, so that the driving part 32 and the knocking arm 33 move with the moving shaft 22. The driving part 32 abuts against the knocking arm 33, and the driving part 32 is configured to drive the knocking arm 33 to rotate, and then the inner wall of the pipeline 10 is knocked to generate an acoustic wave signal.

Exemplarily, the mounting frame 31 includes an adapter disc 313 and a supporting frame 315 arranged on the adapter disc 313.

The adapter disc 313 has a through hole, the center of the through hole coincides with the center of the adapter disc 313, and the outer diameter of the through hole is equal to the outer diameter of the moving shaft 22, so that the adapter disc 313 can be sheathed on the moving shaft 22 through the through hole. Further, the adapter disc 313 is also tightly connected with the moving shaft 22 by a cylindrical pin, and the cylindrical pin is arranged perpendicular to the extending direction of the moving shaft 22, thereby preventing rotation between the adapter disc 313 and the moving shaft 22.

The support frame 315 is a flat plate structure, where the support frame 315 includes a horizontal plate 3151, a vertical plate 3155 and a curved plate 3153. The extending direction of the horizontal plate 3151 is parallel to the extending direction of the moving shaft 22, and the extending direction of the vertical plate 3155 is perpendicular to the extending direction of the moving shaft 22. The curved plate 3153 is located between the horizontal plate 3151 and the vertical plate 3155, and is configured to connect the horizontal plate 3151 and the vertical plate 3155. As shown in FIG. 2, the support frame 315 includes two above-mentioned flat plate structures arranged opposite to each other, and the horizontal plates 3151 and the adapter disc 313 can be connected with thread. A first supporting shaft 341 is disposed on the horizontal plates 3151, both ends of the first supporting shaft 341 are connected with the horizontal plates 3151 by rolling bearings 35, so that the first supporting shaft 341 can be rotatably connected with the horizontal plates 3151. A second supporting shaft 343 is disposed at ends of the vertical plates 3155 close to the inner wall of the pipeline 10, and both ends of the second supporting shaft 343 are connected with the vertical plates 3155 by rolling bearings 35, so that the second supporting shaft 343 can be rotatably connected with the vertical plates 3155.

Exemplarily, the driving part 32 may be substantially a rod-shaped structure. One end of the driving part 32 is tightly connected to the first supporting shaft 341 by a flat key, so that the one end of the driving part 32 is rotatably connected with the mounting frame 31. The other end of the driving part 32 is rotatably connected with a rotating shaft 37. Specifically, both ends of the rotating shaft 37 are connected with the driving part 32 by the rolling bearings 35. The rotating shaft 37 is also provided with a friction wheel 321 and a cam 323 fixedly connected with the friction wheel 321. Specifically, the friction wheel 321 and the rotating shaft 37 can be connected by a flat key, and the cam 323 and the rotating shaft 37 can be connected by a cylindrical pin. The friction wheel 321 is configured to abut against the inner wall of the pipeline 10, so that the friction wheel 321 drives the rotating shaft 37 to rotate, and then drives the cam 323 to rotate synchronously. Further, the maximum outer diameter of the cam 323 is smaller than the outer diameter of the friction wheel 321, so as to prevent the cam 323 from contacting with the inner wall of the pipeline 10.

Figure 5:
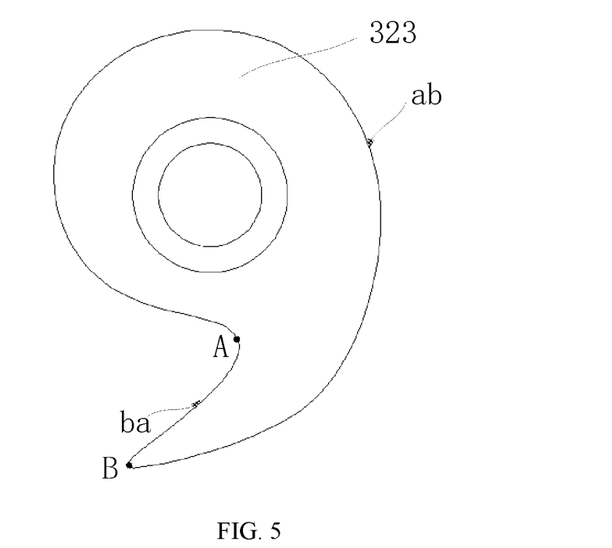
FIG. 5 is a schematic structural diagram of a cam in a pipeline structural fault diagnosis apparatus provided by an embodiment of the present application.

As shown in FIG. 5, the cam 323 in this embodiment may be a disc-shaped cam 323. The cam 323 has a first contour line segment ab and a second contour line segment ba. The two intersection points of the first contour line segment ab and the second contour line segment ba are A and B, the outer diameter of the first contour line segment ab gradually increases from point A to point B, and the outer diameter of the second contour line segment ba decreases from point B to point A.

Exemplarily, the knocking arm 33 may be substantially a rod-shaped structure. The middle portion of the knocking arm 33 and the second supporting shaft 343 are tightly connected by a flat key, so that the knocking arm 33 is rotatably connected to the mounting frame 31. The end of the knocking arm 33 close to the driving part 32 abuts against the cam 323, and the end of the knocking arm 33 far away from the driving part 32 is provided with a bump 331, and the bump 331 is disposed perpendicular to the extending direction of the knocking arm 33.

Further, the knocking arm 33 has a mounting hole 333, the mounting hole 333 is configured to mount the bump 331 for knocking the inner wall of the pipeline 10, and the axis of the mounting hole 333 is perpendicular to the extending direction of the knocking arm 33. When the cam 323 rotates with the friction wheel 321, because one end of the knocking arm 33 abuts against a outer contour of the cam 323, the one end of the knocking arm 33 swings, so as to make the knocking arm 33 rotate counterclockwise with the second supporting shaft 343 as the rotation axis, the bump 331 moves toward the direction close to the inner wall of the pipeline 10, so that the bump 331 can knock the inner wall of the pipeline 10 to generate an acoustic wave signal.

It should be noted that the knocking arm 33 has a plurality of mounting holes 333, and the bump 331 is detachably mounted in one of the mounting holes 333. The plurality of mounting holes 333 are arranged at intervals along the extending direction of the knocking arm 33, which is helpful for the bump 331 to change position on the knocking arm 33 to generate knocking acoustic waves with different volumes.

As shown in FIG. 4, the position that the mounting hole 333 is far away from the driving part 32 is a far-end, and the position that the mounting hole 333 is close to the driving part 32 is a near-end. When an acoustic wave with a high volume needs to be generated, the bump 331 can be mounted in a mounting hole 333 at the far-end, on the contrary, when an acoustic wave with a lower volume needs to be generated, the bump 331 can be mounted in a mounting hole 333 at the near-end.

Figure 6:
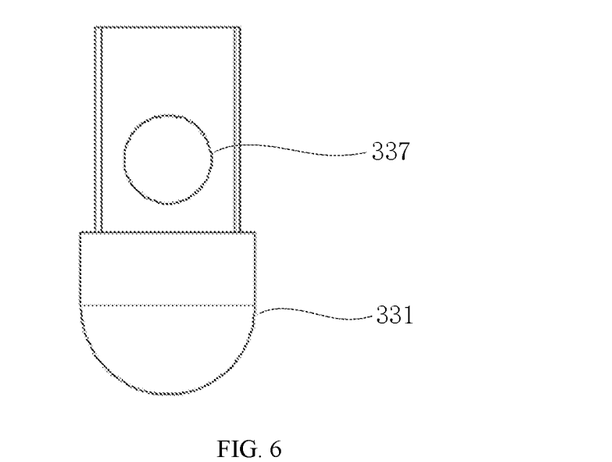
FIG. 6 is a schematic structural diagram of the matching hole in a pipeline structural fault diagnosis apparatus provided by an embodiment of the present application.

Correspondingly, the knocking arm 33 also has a plurality of positioning thread holes 335, each of mounting holes 333 is connected with one of the positioning thread holes 335, and the center lines of the positioning thread holes 335 are perpendicular to the center lines of the mounting holes 333. As shown in FIG. 6, the bump 331 also have a matching hole 337, a portion of the bump 331 is inserted in one of the mounting holes 333, fastening bolts 339 are matched with the positioning thread holes 335, and the matching hole 337 is inserted by a corresponding fastening bolt 339, so that the bump 331 is detachably mounted in the mounting hole 333.

Continuing to refer to FIG. 3, the knocking member 30 further includes a first elastic member 361 and a second elastic member 363. In this embodiment, the first elastic member 361 and the second elastic member 363 may be springs. Of course, in some other embodiments, the first elastic member 361 and the second elastic member 363 may also be rubber elastomers.

Exemplarily, one end of the first elastic member 361 is connected with the mounting frame 31, and the other end of the first elastic member 361 is connected with the driving part 32, and the first elastic member 361 is configured to drive the driving part 32 to rotate towards the inner wall of the pipeline 10.

As shown in FIG. 3, one end of the first elastic member 361 is connected with the adapter disc 313, and the other end of the first elastic member 361 is connected with the end of the driving part 32 that is far away from the inner wall of the pipeline 10, so that the driving part 32 can receive a downward elastic tension. In the process that the moving member 20 drives the knocking member 30 to move, the friction wheel 321 is in contact with the inner wall of the pipeline 10, so that the friction wheel 321 receives an upward supporting force, so that the driving part 32 has a movement tendency to rotate counterclockwise with the first supporting shaft 341 as the rotation shaft. Due to the action of the first elastic member 361, the friction wheel 321 abuts against the inner wall of the pipeline 10 with a certain pressure to prevent the friction wheel 321 from slipping, thereby ensuring that the friction wheel 321 rolls relative to the inner wall of the pipeline 10.

Exemplarily, one end of the second elastic member 363 is connected with the driving part 32, the other end of the second elastic member 363 is connected with the knocking arm 33, and the second elastic member 363 is configured to drive the other end of the knocking arm 33 that is far away from the bump 331 to rotate towards the inner wall of the pipeline 10.

As shown in FIG. 3, the one end of the second elastic member 363 is connected with the end of the driving part 32 that is far away from the inner wall of the pipeline 10, and the other end of the second elastic member 363 is connected with a middle portion of the knocking arm 33, so that the knocking arm 33 can receive an upward elastic tension. During the rotation of the cam 323, one end of the knocking arm 33 swings along the first contour line segment ab, so that the knocking arm 33 rotates clockwise with the second supporting shaft 343 as the rotation shaft, thereby driving the bump 331 to move away from the inner wall of the pipeline 10, so that the second elastic member 363 is stretched and deformed. The one end of the knocking arm 33 swings along the second contour line segment ba, and under the action of the elastic restoring force of the second elastic member 363, the knocking arm 33 rotates counterclockwise with the second supporting shaft 343 as the rotation shaft, thereby driving the bump 331 to move toward the inner wall of the pipeline 10, and knocking the inner wall of the pipeline 10 to generate an acoustic wave signal.

Referring to FIG. 3, the movement process of the signal generating apparatus 11 is briefly described below.

As the moving member 20 moves in the pipeline 10, the knocking member 30 also follows the moving member 20 to move along the inner wall of the pipeline 10. In this embodiment, the moving member 20 moves to the left side of the position shown in the figure, the friction wheel 321 rolls relative to the inner wall of the pipeline 10, thereby causing the cam 323 to rotate counterclockwise synchronously. When one end of the knocking arm 33 swings along the first contour line segment ab, the knocking arm 33 rotates clockwise with the second supporting shaft 343 as the rotation shaft, thereby driving the bump 331 to move to the highest point in the direction away from the inner wall of the pipeline 10; when the one end of the knocking arm 33 swings along the second contour line segment ba, the knocking arm 33 rotates counterclockwise with the second supporting shaft 343 as the rotation shaft under the action of the elastic restoring force of the second elastic member 363, thereby driving the bump 331 to move toward the direction close to the inner wall of the pipeline 10 until contacting with the pipeline 10, thereby generating a periodic acoustic wave signal.

Alternatively, the pipeline structural fault diagnosis apparatus further includes a position detecting apparatus 80, and the position detecting apparatus 80 is configured to detect the position of the pipeline structural fault diagnosis apparatus in the pipeline, so that an operator can make timely prevention according to the fault position and improve the operation safety of the pipeline 10.

In this embodiment, continuing to refer to FIG. 1, the position detecting apparatus 80 includes a mileage wheel 23, the mileage wheel 23 is connected with the moving shaft 22, and the mileage wheel 23 is also configured to abut against the inner wall of the pipeline 10, so that the mileage wheel 23 can roll along the inner wall of the pipeline 10, which is beneficial for the moving member 20 to move in the pipeline 10. Exemplarily, the mileage wheel 23 includes a shaft arm and a roller, the shaft arm is tightly connected to the moving shaft 22, and the roller is rotatably connected with the shaft arm. Further, the moving member 20 is provided with a plurality of mileage wheels 23, and the mileage wheels 23 are arranged around the circumferential direction of the moving shaft 22, which is beneficial for the mileage wheels 23 to support and fix the moving shaft 22.

It should be noted that the mileage wheel 23 is a device that can calculate accumulated walking distance according to rolling distance per unit time and walking time. Specifically, the mileage wheel 23 transmits a certain number of pulses each time when it rolls for a perimeter, and a pulse acquisition unit is also mounted on the shaft arm of the mileage wheel 23 to collect the number of pulses transmitted by the mileage wheel 23 in real time. According to the measured number of pulses, the distance that the mileage wheel 23 rolls over can be calculated, and then the moving mileage of the moving member 20 can be collected. Correspondingly, the signal storage apparatus 50 is also configured to store the moving mileage, so that the fault position can be subsequently determined according to the moving mileage.

In some other examples, the position detecting apparatus 80 may also include a weld seam detecting apparatus. Specifically, the weld seam alignment technique can be used to determine fault position: a weld seam detecting apparatus can be mounted on the moving member 20, and the specific position of the pipeline 10 can be determined by the number of detected weld seams, and then the specific position of the acoustic wave signal can be determined. When the subsequent fault identification is performed on the acoustic wave signal, the specific position of the fault can be obtained.

In this embodiment, referring to FIG. 1, the moving member 20 further includes a battery 60, the battery 60 is connected with the moving shaft 22, so that the battery 60 can move with the moving member 20. Further, the battery 60 is electrically connected with the mileage wheel 23, so that the battery 60 supplies power to a pulse counter of the mileage wheel 23.

Figure 7:
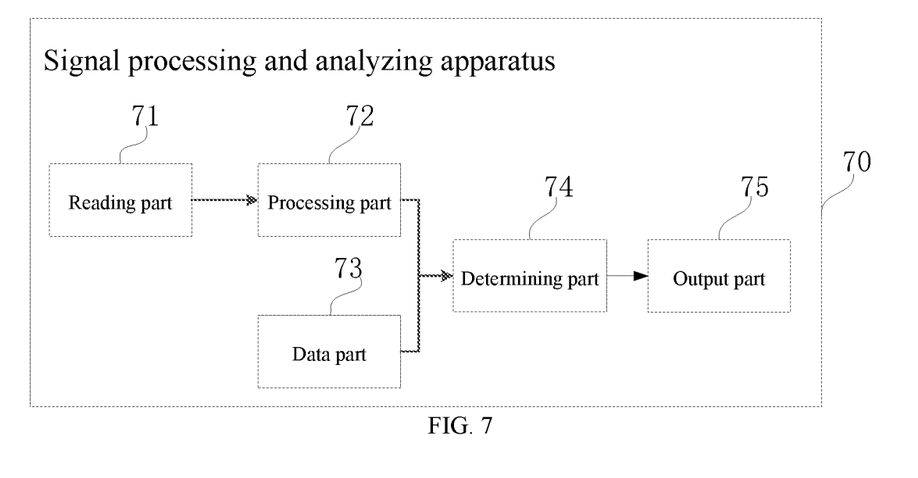
FIG. 7 is a schematic structural diagram of a signal analysis and processing apparatus provided by an embodiment of the present application.

In this embodiment, referring to FIG. 7, the signal processing and analyzing apparatus 70 may include a reading part 71, a data part 73, a processing part 72, and a determining part 74.

It should be noted that the reading part 71, the data part 73, the processing part 72, and the determining part 74 are all presented in the form of functional units. The "unit" here should be understood as the broadest possible meaning, and an object configured to implement the described functions of respective "units" may be, for example, a processor (shared, dedicated, or a chipset) for executing one or more software or firmware programs and a memory, a combinational logic circuit, and/or other suitable components that provide the functions described above. The composition form of the hardware carrier of the signal processing and analyzing apparatus 70 in this embodiment may specifically be a computer device.

The reading part 71 is configured to read the acoustic wave signal stored in the signal storage apparatus 50, so as to input the acoustic wave signal to the processing part 72 for processing. In this embodiment, the reading part 71 can also be configured to read the moving mileage stored in the signal storage apparatus 50, and obtain the fault position based on the moving mileage. For example, after the reading part 71 reads the moving mileage and the acoustic wave signal, the moving mileage and the data of the acoustic wave signal are aligned by setting the collection frequency of the mileage wheel 23, and then the specific position of the acoustic wave signal collected each time can be obtained. Subsequently, when the fault identification is performed on the acoustic wave signal, the specific fault position can be obtained.

The processing part 72 is connected in communication with the reading part 71 for extracting a signal feature based on the acoustic wave signal. It should be noted that the processing part 72 first needs to preprocess the acoustic wave signal to obtain a denoised signal, so as to remove a high frequency interference signal in the acoustic wave signal transmitted from the reading part 71 to the processing part 72. The preprocessing process can be implemented, for example, by using a low-pass filter.

In this embodiment, since the denoised signal is a time-domain signal, the denoised signal needs to be converted into a frequency-domain signal in the subsequent analysis and identification of the acoustic wave signal. In the step of obtaining the frequency-domain signal, for example, it can be implemented by means of Fourier transform.

After the frequency-domain signal is obtained, feature extraction is performed on the obtained time-domain signal and frequency-domain signal respectively to obtain a corresponding time-domain signal feature and a corresponding frequency-domain signal feature. The feature extraction process can be implemented by feature extraction methods for acoustic wave signal in the prior art, which will not be repeated in this embodiment.

A sample database is set in the data part 73, and the sample database includes a plurality of sets of simulation signal features of different fault types and fault degrees for the acoustic wave signal to compare to determine the fault type and fault degree.

In this embodiment, the simulation calculation of pipeline structural faults can be performed by a large amount of simulation data to obtain simulation signals. After the simulation signals are obtained, the simulation signals are subjected to feature extraction respectively to obtain the corresponding time-domain simulation signal features and frequency-domain simulation signal features. After the simulation signal features are obtained, the simulation signals and the simulation signal features are stored to establish a simulation database for subsequent comparison with an acoustic wave signal and a feature signal. After the simulation database is established, the signals in the simulation database are trained and classified to form a sample database. The sample database has a plurality of sets of simulation signal features with different fault types and fault degrees. For example, support vector machine method can be used to train and classify the signals in the simulation database, or it can also be implemented by typical algorithms such as minimum distance method, neural network, decision tree method, and hidden Markov model.

The determining part 74 is connected in communication with the reading part 71 and the data part 73, and is configured to compare a signal feature with a simulation signal feature, determine and output the fault type and the fault degree based on the comparison result. Specifically, by the method of AI identification and comparison, a time-domain signal feature of a measured acoustic wave signal and a time-domain simulation signal feature of a simulation signal are compared, and a frequency-domain signal feature of the measured acoustic wave signal and a frequency-domain simulation signal feature of the simulation signal are compared to determine the fault type and fault degree of the measured acoustic wave signal.

Further, the signal processing and analyzing apparatus 70 further includes an output part 75, the output part 75 is configured to output the fault type, fault degree, and fault position, so that the operator can make timely prevention according to the diagnosis result and improve the operation safety of the pipeline 10. The output part 75 may include a display, the fault type, fault degree, and fault position are output on the display. Or, the output part 75 may also include a printing device, which outputs the fault type, fault degree, and fault position by means of printing a report.

Figure 8:
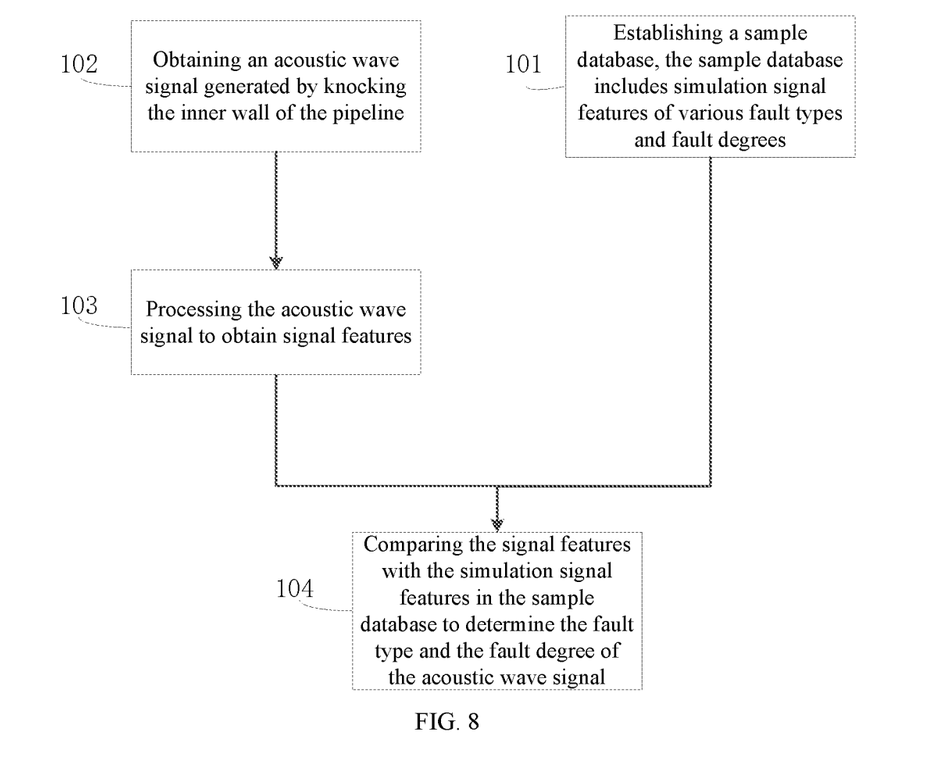
FIG. 8 is a flowchart of a diagnosis method provided by an embodiment of the present application.

An embodiment of the present application also provides a diagnosis method, which is implemented by the above-mentioned pipeline structural fault diagnosis apparatus. Referring to FIG. 8, the method includes the following steps.

Step S101, a sample database is established, the sample database includes simulation signal features of various fault types and fault degrees.

It should be noted that, referring to FIG. 7, the pipeline structural fault diagnosis apparatus may include a signal processing and analyzing apparatus 70, where the signal processing and analyzing apparatus 70 includes a data part 73. The data part 73 is provided with a sample database for an acoustic wave signal to compare, and then determine the fault type and the fault degree.

Step S102, an acoustic wave signal generated by knocking an inner wall of a pipeline is obtained.

In this embodiment, the acoustic wave signal is generated by a signal generating apparatus 11, and then the acoustic wave signal is collected by a signal collecting apparatus 40. The signal generating apparatus 11 includes a moving member 20 for moving inside the pipeline 10 and a knocking member 30 connected with the moving member 20. The signal collecting apparatus 40 is connected with the moving member 20.

The knocking member 30 is configured to knock the inner wall of the pipeline 10 to generate the acoustic wave signal. The knocking member 30 may be the mechanical structure in the above-mentioned embodiments, may also be an electric knocking device, which is not further limited in this embodiment. The moving member 20 and the signal collecting apparatus 40 may be any one of the structures in the above-mentioned embodiments, which will not be repeated here.

In this embodiment, the pipeline structural fault diagnosis apparatus may further include a signal storage apparatus 50, the signal storage apparatus 50 is connected with the signal collecting apparatus 40. The signal storage apparatus 50 is configured to store the acoustic wave signal for subsequent processing and analysis of the acoustic wave signal. The signal storage apparatus 50 may be any one of the structures in the above-mentioned embodiments, which will not be repeated here.

It should be noted that, in this embodiment, the position information of the acoustic wave signal is also stored while the acoustic wave signal is stored. The pipeline structural fault diagnosis apparatus also includes a position detecting apparatus 80, the position detecting apparatus 80 is connected with the moving member 20, and the position detection apparatus 80 is configured to detect the position of the pipeline structural fault diagnosis apparatus in the pipeline, so that the operator can make timely prevention according to the fault position and improve the operation safety of the pipeline 10. The position detecting apparatus 80 may include any one of the structures in the above-mentioned embodiments, which will not be repeated here.

Step S103, the acoustic wave signal is processed to obtain a signal feature.

The signal processing and analyzing apparatus 70 further includes a reading part 71 and a processing part 72 connected in communication with the reading part 71. The reading part 71 is configured to read the acoustic wave signal stored in the signal storage apparatus 50, so as to input the acoustic wave signal to the processing part 72 for processing, and the processing part 72 is configured to extract a feature signal based on the acoustic wave signal.

In an embodiment in which the position detection apparatus is a mileage wheel, the reading part 71 may also be configured to read the moving mileage stored in the signal storage apparatus 50, and obtain the fault position based on the moving mileage. For example, after the reading part 71 reads the moving mileage and the acoustic wave signal, the moving mileage and the data of the acoustic wave signal are aligned by setting the collection frequency of the mileage wheel 23, and then the specific position of the acoustic wave signal collected each time can be obtained. Subsequently, when the fault identification is performed on the acoustic wave signal, the specific fault position can be obtained.

Step S104, the signal feature is compared with a simulation signal feature in the sample database to determine the fault type and the fault degree of the acoustic wave signal.

The signal processing and analyzing apparatus 70 further includes a determining part 74, the determining part 74 is connected in communication with the reading part 71 and the data part 73, and is configured to compare the signal feature with the simulation signal feature, determine and output the fault type and the fault degree based on the comparison result. Specifically, by comparing a time-domain signal feature of the measured acoustic wave signal and a time-domain simulation signal feature of the simulation signal, and by comparing a frequency-domain signal feature of the measured acoustic wave signal and a frequency-domain simulation signal feature of the simulation signal to determine the fault type and fault degree of the measured acoustic wave signal.

In a possible implementation, AI identification and comparison can be used. Specifically, the comparison and identification with a basic voiceprint database can be implemented by methods such as fuzzy mathematics. Of course, in some other examples, it can also be implemented by technologies that can perform comparison and identification such as machine learning.

In this embodiment, the step of establishing the sample database including the simulation signal features of various fault types and fault degrees may include: performing simulation calculation on pipeline structural faults to obtain simulation signals.

The simulation calculation on pipeline structural faults is performed by a large amount of simulation data to obtain the simulation signals. It should be noted that the simulation data includes simulation values in a variety of different pipeline 10 structures, and in each of the pipeline 10 structures, a variety of simulation values under different fault states are included, for example, simulation values under different stresses, simulation values under different soil backfilling conditions, and simulation values under different defect conditions are included. Corresponding simulation signals can be obtained by a large amount of simulation data, and a simulation signal includes a time-domain simulation signal and a corresponding frequency-domain simulation signal.

After the simulation signals are obtained, the step of establishing the sample database further includes: performing feature extraction on the simulation signals to obtain simulation signal features, where one of the simulation signal features includes a time-domain simulation signal feature and a frequency-domain simulation signal feature.

After the simulation signals are obtained, the simulation signals are respectively subjected to feature extraction to obtain corresponding time-domain simulation signal features and frequency-domain simulation signal features. Specifically, the simulation signal feature may include, for example, a total power spectrum, Rice frequency, gravity center of frequency, frequency variance, mean frequency, waveform mean frequency, and a waveform stability factor. The feature extraction process can be implemented by feature extraction methods for acoustic wave signal in the prior art, which will not be repeated in this embodiment.

Further, factor analysis can be performed after the simulation signal features are obtained. Factor analysis is a data processing method for reducing the dimension of a large number of data based on correlation, which is beneficial to extract a common factor from simulation signal features of different pipeline 10 structures. This facilitates the subsequent classification of the simulation signal features. Of course, in some other examples, principal component analysis, and manifold learning method can also be used for implementation.

After the simulation signal features are obtained, the step of establishing the sample database further includes storing the simulation signals and the simulation signal features to establish a simulation database for subsequent comparison with the acoustic wave signal and the feature signal.

After the simulation database is established, the step of establishing the sample database further includes classifying the simulation database to establish the sample database.

After the simulation database is established, the signals in the simulation database are trained and classified to form a sample database. The sample database has a plurality of sets of simulation signal features with different fault types and fault degrees. In this embodiment, the support vector machine method can be used to train and classify the signals in the simulation database, for example, the signals can be classified into external stress fault, soil backfilling condition fault, defect fault, etc. Of course, in some other examples, it can also be implemented by typical algorithms such as minimum distance method, neural network, decision tree method, hidden Markov model, etc.

In this embodiment, the step of processing the acoustic wave signal to obtain the signal feature further includes: performing a preprocessing to obtain a denoised signal.

It should be noted that the processing part 72 first needs to preprocess the acoustic wave signal to obtain a denoised signal, so as to remove a high frequency interference signal in the acoustic wave signal transmitted from the reading part 71 to the processing part 72. The preprocessing process can be implemented, for example, by using a low-pass filter.

After the denoised signal is obtained, the step of processing the acoustic wave signal to obtain the signal feature further includes: performing time-spectrum conversion on the denoised signal to obtain a frequency-domain signal.

In this embodiment, since the denoised signal is a time-domain signal, the denoised signal needs to be converted into a frequency-domain signal in the subsequent analysis and identification of the acoustic wave signal. In the step of obtaining the frequency-domain signal, for example, it can be implemented by means of Fourier transform.

After the frequency-domain signal is obtained, the step of processing the acoustic wave signal to obtain the signal feature further includes: performing feature extraction on the frequency-domain signal to obtain the signal feature, and the signal feature includes a time domain signal feature and a frequency domain signal feature.

After the frequency domain signal is obtained, feature extraction is performed on the obtained time-domain signal and frequency-domain signal respectively, so as to obtain the corresponding time-domain feature and frequency-domain feature. The feature extraction process can be implemented by feature extraction methods for acoustic wave signal in the prior art, which will not be repeated in this embodiment.

It is worth noting that, in the diagnosis method provided in this embodiment, after the fault type and fault degree of the acoustic wave signal are determined, the fault type, fault degree and fault position can also be output, so that the operator can make timely prevention according to the diagnosis result and improve the operation safety of the pipeline 10. Further, the signal processing and analyzing apparatus 70 further includes an output part 75, the output part 75 is configured to output the fault type, fault degree, and fault position, so that the operator can make timely prevention according to the diagnosis result and improve the operation safety of the pipeline 10. The output part 75 may include a display, and the fault type, fault degree, and fault position are output on the display. Or, the output part 75 may also include a printing device, which outputs the fault type, fault degree, and fault position by means of printing a report.

It should be noted that the reading part 71, the data part 73, the processing part 72, and the determining part 74 are all presented in the form of functional units. The "unit" here should be understood as the broadest possible meaning, and an object configured to implement the described functions of respective "units" may be, for example, a processor (shared, dedicated, or a chipset) for executing one or more software or firmware programs and a memory, a combinational logic circuit, and/or other suitable components that provide the functions described above. The composition form of the hardware carrier of the signal processing and analyzing apparatus 70 in this embodiment may specifically be a computer device.

In the description of the embodiments of the present application, it should be understood that the terms "center", "longitudinal", "lateral", "length", "width", "thickness", "up", "down", "front", "back", "left", "right", "vertical", "horizontal", "top", "bottom", "inside", "outside", "clockwise", "counterclockwise", "axial", "radial", "circumferential" and other indicated orientations or positional relationships are based on the orientations or positional relationships shown in the figures. This is only for the convenience of describing the present application and simplifying the description, rather than indicating or implying the indicated apparatus or elements must have a particular orientation, be constructed and operated in a particular orientation, and therefore should not be understood as a limitation to the present application.

In addition, the terms "first" and "second" are only used for descriptive purposes, and should not be understood as indicating or implying relative importance or implying the number of indicated technical features. Thus, a feature delimited with "first", "second" may expressly or implicitly include at least one of the feature. In the description of the embodiments of the present application, "a plurality of"

means at least two, such as two, three, etc., unless otherwise expressly and specifically limited.

In the embodiments of the present application, unless otherwise expressly specified and limited, terms such as "mount", "connect", "couple", "fix" and other terms should be understood in a broad sense, for example, it may be fixed connection, detachable connection, or integration; may be direct connection, may be indirect connection by an intermediate medium, or may be the internal connection between two elements or the interaction relationship between two elements, unless otherwise expressly limited. For those of ordinary skill in the art, the specific meanings of the above terms in the present application can be understood according to specific situations.

In the description of this specification, description with reference to the terms "one embodiment", "some embodiments", "example", "specific example", or "some examples", etc., mean specific features, structures, materials, or characteristics described in conjunction with the embodiment or example are included in at least one embodiment or example of the present application. In this specification, schematic representations of the above terms are not necessarily directed to the same embodiment or example. And, the described specific features, structures, materials, or characteristics may be combined in any suitable manner in any one or more embodiments or examples. Furthermore, those skilled in the art may combine and compose different embodiments or examples described in this specification, as well as the features of the different embodiments or examples, without conflicting each other.

Finally it should be noted that: the above implementations are only used to illustrate the technical solutions of the present application, rather than limiting them. Although the present application has been described in detail with reference to the foregoing embodiments, those of ordinary skill in the art should understand that they may still make modifications to the technical solutions recorded in the foregoing embodiments, or make equivalent replacements to some or all of the technical features; and these modifications or replacements do not make the essence of the corresponding technical solutions depart from the scope of the technical solutions of embodiments of the present application.

What is claimed is:

1. A pipeline structural fault diagnosis apparatus comprising:
   a signal generating apparatus, the signal generating apparatus comprising a moving member and a knocking member arranged on the moving member, the moving member configured to move along an inner wall of a pipeline, and the knocking member configured to knock the inner wall of the pipeline to generate an acoustic wave signal;
   a signal collecting apparatus connected with the moving member, the signal collecting apparatus configured to collect the acoustic wave signal;
   a signal storage apparatus connected with the signal collecting apparatus, the signal storage apparatus configured to store the acoustic wave signal for a signal processing and analyzing apparatus to analyze and determine a fault type, a fault degree, and a fault position.

2. The pipeline structural fault diagnosis apparatus according to claim 1, wherein the knocking member comprises a mounting frame, a driving part, and a knocking arm; wherein the mounting frame is connected with the moving member, and a middle portion of the knocking arm is rotatably connected with the mounting frame; and wherein one end of the driving part is connected with the mounting frame, and the other end of the driving part is rotatably connected with a rotating shaft, and the rotating shaft is provided with a friction wheel and a cam fixedly connected with the friction wheel, the friction wheel is configured to abut against the inner wall of the pipeline, the cam is configured to abut against one end of the knocking arm, and the cam is configured to drive the knocking arm to rotate to make the other end of the knocking arm knock the inner wall of the pipeline.

3. The pipeline structural fault diagnosis apparatus according to claim 2, wherein the knocking member further comprises a first elastic member and a second elastic member, the driving part is hinged with the mounting frame, and one end of the first elastic member is connected with the mounting frame, the other end of the first elastic member is connected with the driving part, and the first elastic member is configured to drive the driving part to rotate toward the inner wall of the pipeline;
   one end of the second elastic member is connected with the driving part, and the other end of the second elastic member is connected with the knocking arm, and the second elastic member is configured to drive the end of the knocking arm that is far away from the cam to rotate toward the inner wall of the pipeline.

4. The pipeline structural fault diagnosis apparatus according to claim 3, wherein the knocking arm of the pipeline structural fault diagnosis apparatus has a plurality of mounting holes for mounting a bump, the bump is configured to knock the inner wall of the pipeline, the bump is detachably mounted in one of the mounting holes, and the plurality of mounting holes are arranged at intervals along an extending direction of the knocking arm.

5. The pipeline structural fault diagnosis apparatus according to claim 4, wherein the knocking arm further has a plurality of positioning thread holes, each of the positioning thread holes is connected with one of the mounting holes, and center lines of the positioning thread holes are perpendicular to center lines of the mounting holes respectively; the bump is provided with a matching hole, a portion of the bump is inserted in the mounting hole, fastening bolts are matched with the positioning thread holes respectively, and the matching hole is inserted by a corresponding fastening bolt.

6. The pipeline structural fault diagnosis apparatus according to claim 1, wherein the moving member comprises a moving shaft and a plurality of supporting members, and the plurality of supporting members are arranged at intervals along a shaft of the moving shaft, each supporting member configured for elastic interference fit with the pipeline.

7. The pipeline structural fault diagnosis apparatus according to claim 6, wherein the pipeline structural fault diagnosis apparatus further comprises a position detecting apparatus, and the position detecting apparatus is configured to detect a position of the pipeline structural fault diagnosis apparatus in the pipeline; the signal storage apparatus is also configured to store the position.

8. A diagnosis method applied to the pipeline structural fault diagnosis apparatus according to claim 1, comprising:
   establishing a sample database, and the sample database comprises simulation signal features of various fault types and fault degrees;
   obtaining an acoustic wave signal generated by knocking an inner wall of a pipeline;
   processing the acoustic wave signal to obtain a signal feature;

comparing the signal feature with a simulation signal feature in the sample database to determine a fault type and a fault degree of the acoustic wave signal.

9. The diagnostic method according to claim 8, wherein the establishing the sample database, and the sample database comprises the simulation signal features of various fault types and fault degrees, comprises:
- performing simulation calculation on pipeline structural faults to obtain simulation signals;
- performing feature extraction to obtain simulation signal features, and one of the simulation signal features comprises a time-domain simulation signal feature and a frequency-domain simulation signal feature;
- storing the simulation signals and the simulation signal features to establish a simulation database; and
- classifying the simulation database to establish the sample database.

10. The diagnosis method according to claim 8, wherein the processing the acoustic wave signal to obtain the signal feature, comprises:
- performing a preprocessing to obtain a denoised signal;
- performing time-spectrum conversion on the denoised signal to obtain a frequency-domain signal;
- performing feature extraction to obtain the signal feature, and the signal feature comprises a time-domain signal feature and a frequency-domain signal feature.

* * * * *